Jan. 27, 1925.  1,524,560
H. M. KORETZKY ET AL
DRY CELL BATTERY
Filed March 2, 1920  2 Sheets-Sheet 1
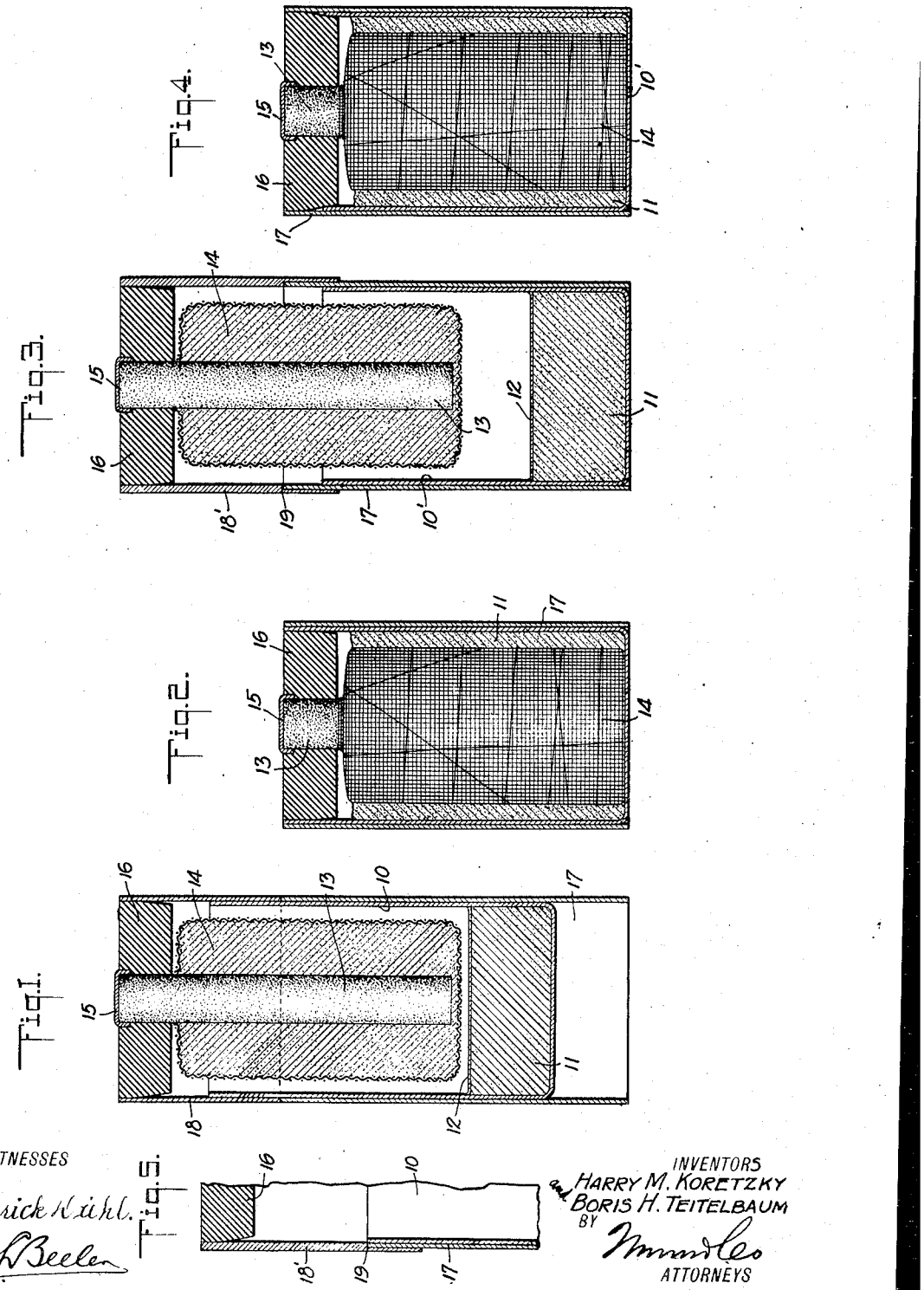
WITNESSES
Frederick Kühl
Geo. L. Beeler
INVENTORS
HARRY M. KORETZKY
BORIS H. TEITELBAUM
BY
ATTORNEYS

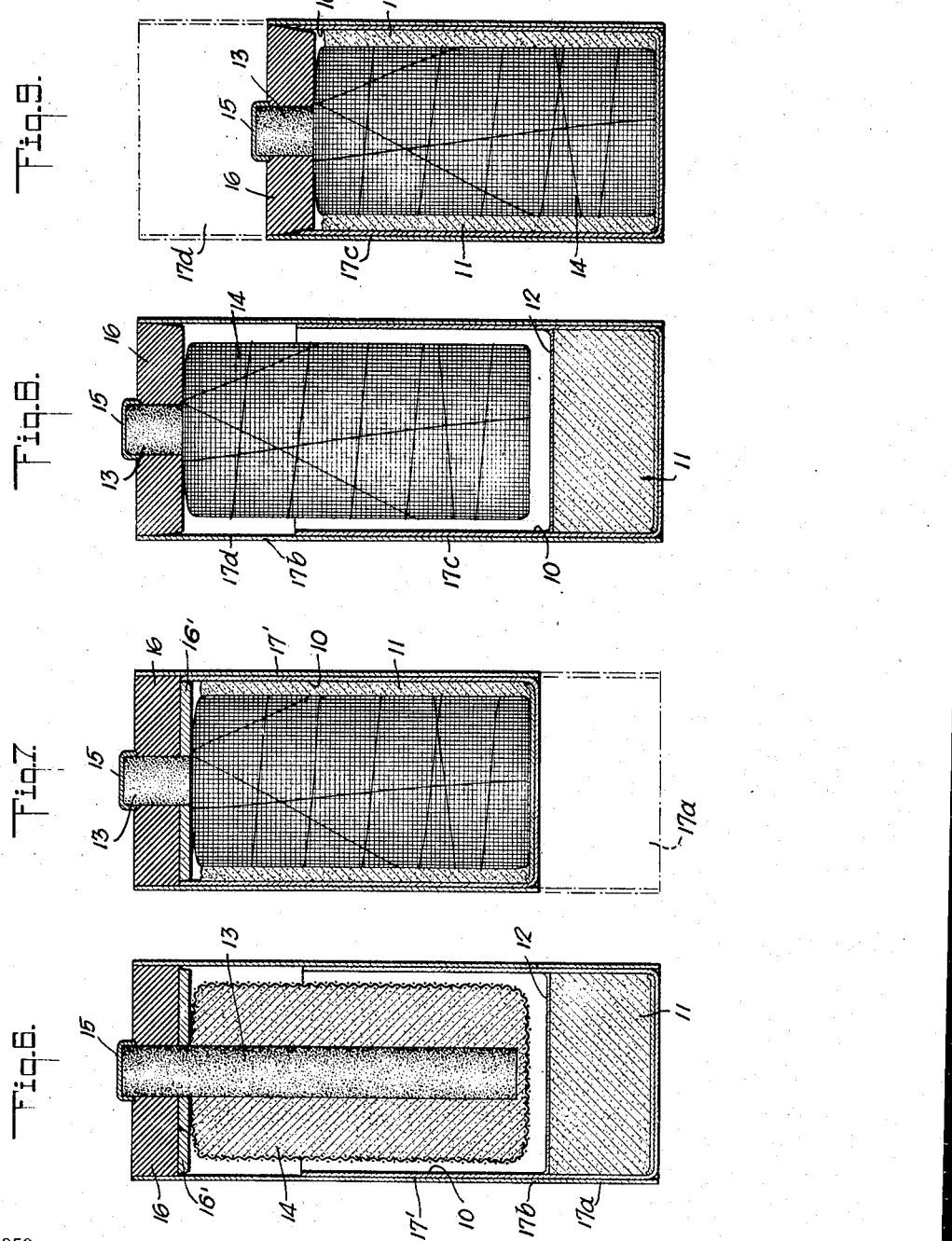

Patented Jan. 27, 1925.

1,524,560

UNITED STATES PATENT OFFICE.

HARRY M. KORETZKY AND BORIS H. TEITELBAUM, OF NEW YORK, N. Y.; SAID TEITELBAUM ASSIGNOR TO SAID KORETZKY AND ISRAEL KORETZKY, OF NEW YORK, N. Y.

DRY-CELL BATTERY.

Application filed March 2, 1920. Serial No. 362,654.

*To all whom it may concern:*

Be it known that we, HARRY M. KORETZKY and BORIS H. TEITELBAUM, citizens of the United States, and residents of the city of New York, borough of Manhattan, in the county and State of New York, have invented a new and Improved Dry-Cell Battery, of which the following is a full, clear, and exact description.

This invention relates to dry cell batteries of that type in which the depolarizing member and the electrolyte are kept separated or spaced up to the time that the battery is desired to be put into use so that for preliminary or storage purposes the active agents of the battery are kept inactive, rendering it impossible for any deterioration to take place prematurely.

Among the specific purposes of the present invention is to provide a metallic container having supplied in the bottom thereof a predetermined quantity of electrolytic paste the same being sealed therein, and providing a depolarizing member connected to a sealing member or stopper through a stick of carbon or the like, and a destructible or temporary collar member carried by the closure or stopper member and serving as a means to hold the last mentioned members in connection with the metallic member, but spaced from the electrolyte.

Another object of the invention is to construct a dry cell battery with means to normally or preliminarily hold the active agents of the battery in separated relation to each other, the holding means comprising a pair of co-operating paper tubes or their equivalent, one of which is preferably longer than the other and one of which at least is discardable at the time the parts of the battery are brought into assembly or operative position.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical sectional view of one form of this invention in its preliminary position.

Fig. 2 shows the same in assembly position.

Fig. 3 is a vertical sectional view of a modified form with the parts in position corresponding to Fig. 1.

Fig. 4 is a similar view of the same in assembly position.

Fig. 5 is a detail view indicating a further modification.

Figs. 6 and 7 show preliminary and assembled forms respectively of another modification.

Figs. 8 and 9 are respectively storage and operative position of a further modification.

This invention in all of its forms includes a metallic cup 10 of zinc, or its equivalent, in the closed bottom of which is a supply of any suitable electrolyte 11 preferably in the form of paste and secured or sealed in position as shown in Figs. 1 and 3 by means of a film of paraffin, paper, or other equivalent material that is easily torn or broken, such sealing member being indicated at 12. 13 indicates a stick of carbon, or its equivalent, upon which is built the depolarizing member 14, the carbon stick projecting from one end of the depolarizing member and fitted with a brass or other suitable metallic cap 15 to constitute a contact. 16 indicates a stopper of cork, or its equivalent, adapted to be forced into the otherwise open end of the zinc cup 10. The battery also includes some suitable cheap device or devices on the outside of the cup 10 for holding the depolarizing member spaced from the electrolyte.

In Fig. 1 the spacing means includes two tubular members 17 and 18 of the same diameter. The member 17 is practically equal in length to the zinc cup and is fitted thereon but slipped down below the mouth of the zinc cup far enough to provide a seat for the shorter tubular member 18 which, carrying the stopper 16 and parts connected thereto, is slipped upon the exposed upper end of the zinc cup and abutting against the upper end of the longer tube 17 serves to limit the movement of the depolarizing member into or toward the bottom of the cup. With the parts in the position shown in Fig. 1 the device may be handled or kept for an indefinite length of time without deterioration, and when the battery is desired to be used the operator has but to force the stopper 16 and parts carried thereby directly downward bringing the lower end of the depolarizing member into the mass of electrolyte paste 11 and at the same time forcing the cup 10 down flush with the bottom of the longer tube 17. This action serves to disconnect the shorter tube 18 from the structure and that tube is then discarded and the result is a structure substantially as indicated in Fig. 2 with the electrolyte suitably filling the space between the depolarizing member and the zinc cup, and with the stopper 16 sealing the upper or open end of the cup.

In Figs. 3 and 4 the variation from the first two figures lies in providing an outer or longer paper tube that is substantially the same as in Figs. 1 and 2, but of a quality adapting it to receive the stopper 16 in connection with the zinc cup, said zinc cup being made shorter as shown at 10' than in the first form of the invention. The shorter tube 18' carrying the stopper 16 and parts connected thereto in preliminary condition is made with a shoulder 19 adapted to abut against the upper edge of the outer or longer tube 17. These parts may be carried preliminarily with the bottom of the cup flush with the bottom of the tube 17 and in order to assemble the parts for operation the stopper 16 and parts carried thereby are forced directly inward to the position shown in Fig. 4 at which time or prior thereto the shorter tube 18' may be removed by any suitable means.

As shown in Fig. 5 there is a slight variation from Figs. 3 and 4. The zinc cup 10 may be exactly the same as shown in Figs. 1 and 2 or of a length equal to the length of the tube 17. The shorter tube may be the same as shown at 18', but the stopper 16 in this form will cooperate in assembly position with the upper end of the zinc cup.

In Figs. 6 and 7 the zinc 10 is housed originally within a paper or other frangible tube 17', the same having at its lower end a portion 17ª adapted to be severed from the main portion by reason of a scored or weakened line 17ᵇ. The stopper 16 is carried during this preliminary stage in the upper end of the tube 17' the same as indicated in Figs. 1 and 3, and all the other parts are the same as indicated in Fig. 1 and so the depolarizing member 14 is held spaced from the electrolyte 11 by virtue of the friction between the cup and the paper tube. When the battery is to be used the operator holding the stopper end portion of the battery in one hand will shove up on the bottom of the zinc cup with the fingers or thumb of his other hand and so will bring the parts into the position shown in Fig. 7, causing the depolarizing member to plunge through the sealing member 12 of the electrolyte and also cause the electrolyte to surround the depolarizing member up to or about the stopper. This discardable portion 17ª of the tube may then be cut, broken or torn off leaving a complete battery no longer than the distance between the cap 15 and the bottom of the cup 10. In connection with these figures, attention is invited to the fact that an additional disk 16' of any suitable material which will provide a tight seal is attached below the stopper 16. It is also to be noted that the lower edges of this latter disk are preferably spaced slightly from the inner face of the outer portion of the battery so that upon the cup 10 being moved to the position indicated in Figure 7 that a tight seal will be formed.

The form in Figs. 8 and 9 partakes of some of the features of Figs. 3 and 4 as well as Figs. 6 and 7. The zinc cup 10 carrying the electrolyte is held from movement along the tube 17ᶜ by reason of the friction between the cup and the tube and so for transportation and storage purposes the electrolyte 11 is held spaced from the depolarizing member 14 as in Fig. 8. The upper end 17ᵈ of the tube is separable from the main part of the tube by reason of a weakened connection 17ᵇ so that in the preparation of this battery for use the operator will press downward with his thumb or thumbs upon the stopper 16, carrying with it the depolarizing member, plunging the lower end thereof into the electrolyte and causing the electrolyte to surround the depolarizing member as shown in Fig. 9. The stopper enters that portion of the main tube just below the line 17ᵇ and also projects into the open end of the cup 10 as in Fig. 4. The part 17ᵈ may then be turned off or removed as shown by dotted lines.

We claim:

In a battery of the nature set forth, the combination with a metallic cup, an electrolyte therein, means to hold the electrolyte in the cup, a depolarizing member and a contact member leading therefrom, of means to hold the depolarizing member preliminarily spaced from the cup and the electrolyte, said holding means comprising a tubular member surrounding the cup and having a discardable portion, a stopper carried by said discardable portion and adapted to be forced within the upper end of the upper tube in assembly position.

HARRY M. KORETZKY.
BORIS H. TEITELBAUM.